United States Patent [19]

Colles et al.

[11] 4,298,888
[45] Nov. 3, 1981

[54] NON-INTERLACED TO INTERLACED FORMAT VIDEO CONVERTER

[75] Inventors: Joseph H. Colles, Oceanside; James E. Cooper, Jr., Solona Beach, both of Calif.

[73] Assignee: Hughes Aircraft Company, Culver City, Calif.

[21] Appl. No.: 46,745

[22] Filed: Jun. 8, 1979

[51] Int. Cl.³ .............................................. H04N 5/02
[52] U.S. Cl. .................................................. 358/140
[58] Field of Search .............................. 358/134, 140; 360/8-11

[56] References Cited

U.S. PATENT DOCUMENTS 3,830,971 8/1974 van de Polder .................... 358/140
3,832,487 8/1974 de Niet ............................... 358/140
3,982,063 9/1976 Brown et al. ....................... 358/134
4,057,836 11/1977 Munsey .............................. 358/140

OTHER PUBLICATIONS

Van Buul et al.-Standards Conversion of TV Signal with 625 Lines into Videophone Signal with 313 Lines-Philips Res. Repts. 28, 1973, pp. 377-390.

Primary Examiner—Joseph A. Orsino, Jr.
Attorney, Agent, or Firm—Walter J Adam; W. H. MacAllister

[57] ABSTRACT

A video converter operating in real time that responds to frames of N lines of video data in a non-interlaced format to form two fields of interlaced data without loss of any information. The converter operates with a minimum of two lines of memory storage capacity and a minimum of timing structure. The concept in accordance with the invention allows data of substantially any non-interlaced format to be converted for display on an interlaced display unit such as a standard TV system.

11 Claims, 4 Drawing Figures

Fig. 3.

FIRST FIELD

| INPUT DATA LINES | 10 | 11 | 12 | 13 | 14 | 15 |
|---|---|---|---|---|---|---|
| MEMORY A | 8 | WRITE 11 | WRITE 12 | READ 12 | | WRITE 15 |
| MEMORY B | 10 | READ 10 | | WRITE 13 | WRITE 14 | READ 14 |
| OUTPUT DATA LINES | 8 | 10 | | 12 | | 14 |

SECOND FIELD

| INPUT DATA LINES | 10 | 11 | 12 | 13 | 14 | 15 |
|---|---|---|---|---|---|---|
| MEMORY A | 10 | WRITE 11 | READ 11 | | WRITE 14 | WRITE 15 |
| MEMORY B | | READ 9 | WRITE 12 | WRITE 13 | READ 13 | |
| OUTPUT DATA LINES | | 9 | 11 | | 13 | |

NON-INTERLACED TO INTERLACED FORMAT VIDEO CONVERTER

TECHNICAL FIELD

This invention relates to display systems and particularly to a video converter for converting non-interlaced data in which a single field of N lines equals a display frame to interlaced data having two fields each of N/2 lines for forming a display frame.

BACKGROUND ART

In high resolution information displays the line rate of the scanning display is often at a high rate in a non-interlaced format in order to resolve the amount of picture elements without producing an objectionable amount of flicker. A circuit that would allow this non-interlaced data to be converted for display at a low rate on a normal interlaced projector would be a substantial advantage to the art.

SUMMARY OF THE INVENTION

It is therefore an object of this invention to provide an improved converter for changing the format of data to be displayed.

It is a further object of this invention to provide a system for converting non-interlaced data to interlaced data.

It is another object of this invention to provide a system for converting non-interlaced video data having N lines per field to interlaced data having N lines per frame.

It is still another object of this invention to provide a video converter that allows non-interlaced data to be displayed on a standard television display unit.

The system in accordance with this invention allows N line per field non-interlaced data, in which one field equals one display frame, to be converted to interlaced data of (N/2) lines for each of two fields that form a display frame for display on an interlaced display. The converter of the invention is particularly applicable in a display system having a sufficient information retentivity time that flicker is not a substantial problem. The system first stores and provides a line at a time, all of the lines of the first field which may be the even lines of data followed by storing and providing a line at a time, all of the odd lines of the second field. For this conversion during both the first and second field times, two random access memories are provided each for alternately having a line of input data written therein at a fast rate while the data is read from the other memory at a slow rate. The fast rate which may be 20 MHZ corresponds to the data rate of the non-interlaced input field and the slow rate which may be 10 MHZ corresponds to the data rate of the two interlaced output fields that form an interlaced display frame. The writing of a line into the memory is performed each line time of the fast rate and the reading of a line from the alternate memory is performed over two line times of the input or one line time of the output. The two memories continue to alternate writing and reading to produce two (N/2) line of interlaced fields from the N line field non-interlaced input data, which two fields each of (N/2) data lines are applied to an interlaced display. Thus, two input fields each of which is a display frame of non-interlaced data are converted to two fields of interlaced data which together form an interlaced display frame.

BRIEF DESCRIPTION OF THE DRAWINGS

The novel features that are considered characteristic of this invention are set forth with particularity in the appended claims. The invention itself, both as to its organization and method of operation, as well as additional objects and advantages thereof, will best be understood from the following description when read in connection with the accompanying drawing in which like reference numbers refer to a like part and in which:

FIG. 3 is a schematic timing diagram for explaining the overall operation of the system of FIGS. 1 and 2;

DETAILED DESCRIPTION OF THE INVENTION

Figure 1:
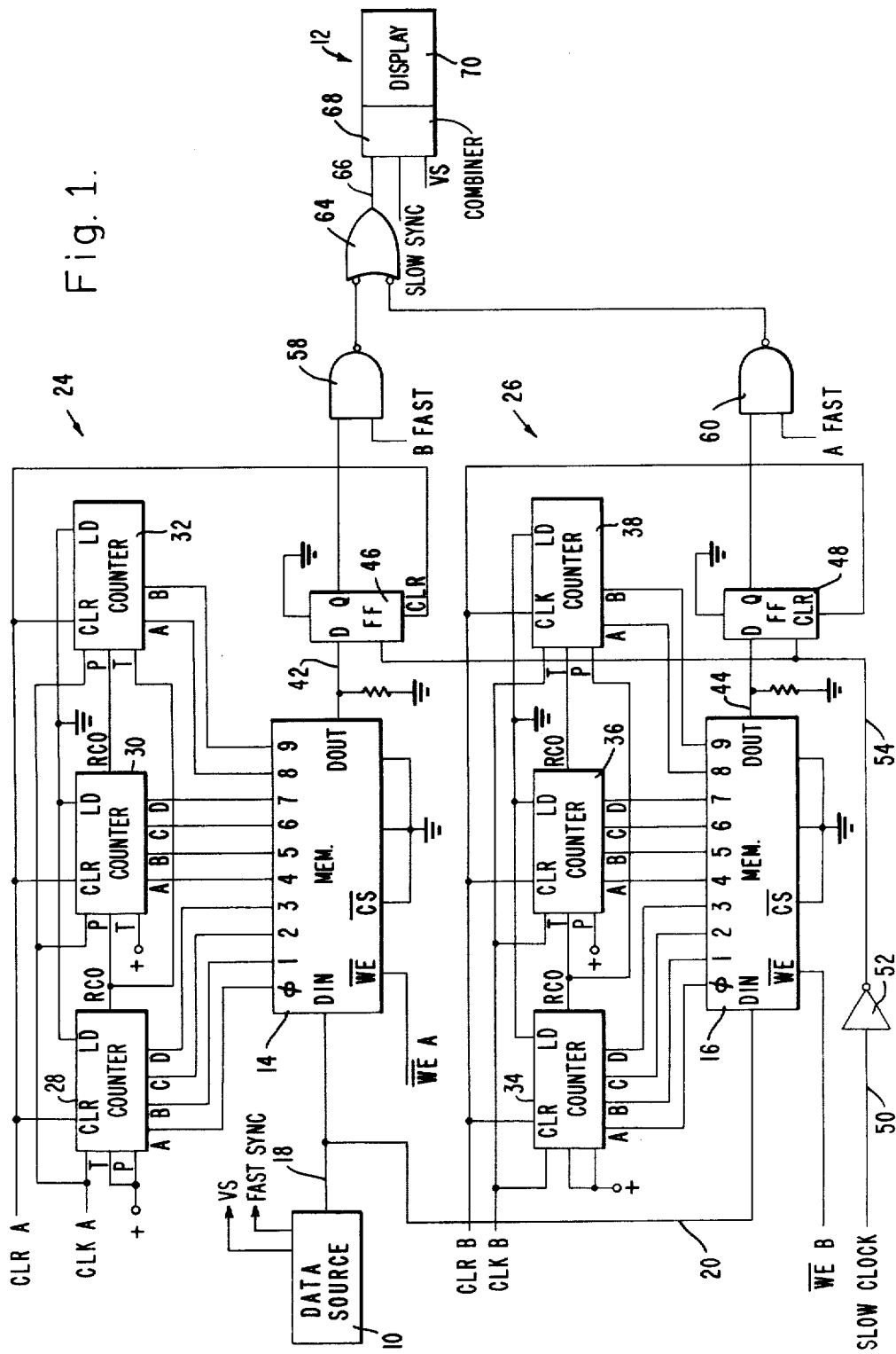
FIG. 1 is a schematic block and circuit diagram of the noninterlaced lines to interlaced lines converted in accordance with the invention.
Figure 2:
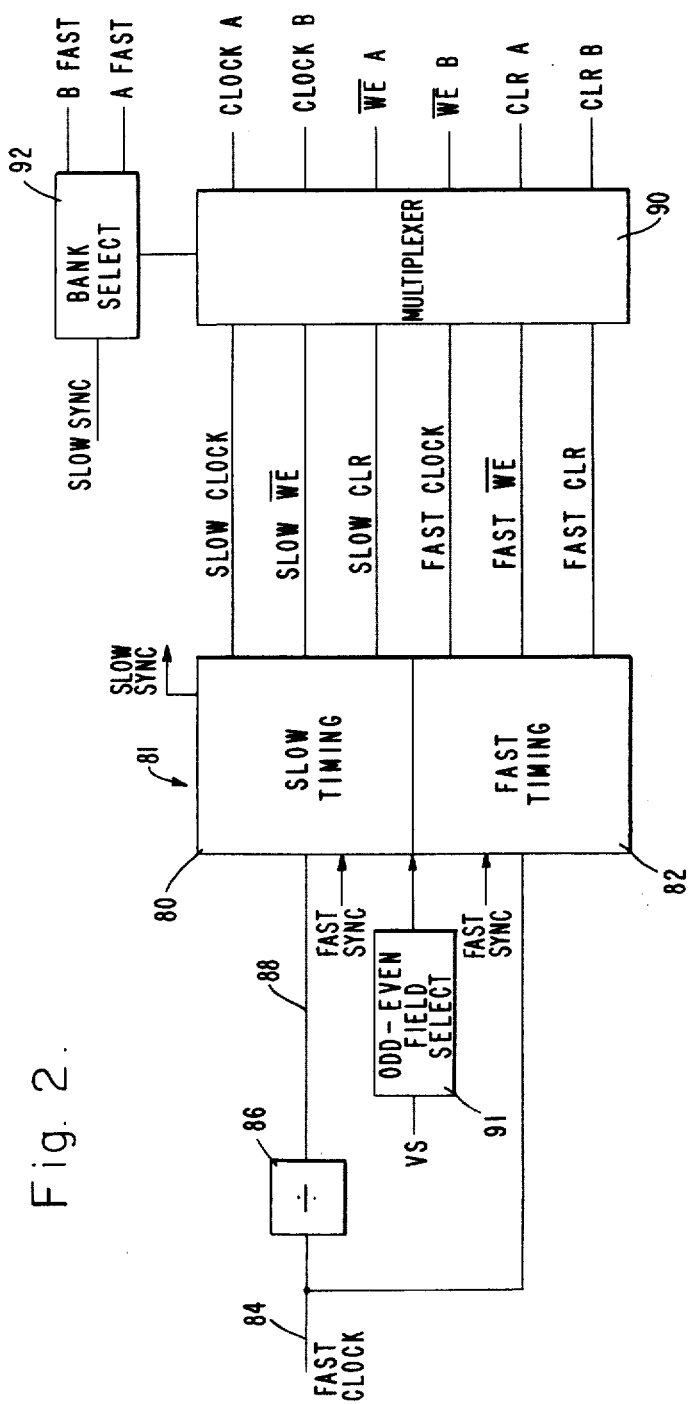
FIG. 2 is a schematic block diagram showing the timing source that may be utilized with the converter of FIG. 1.

Referring first to FIGS. 1 and 2, the converter, in accordance with the invention, responds to a data source 10 providing a non-interlaced data format of N lines for each field with each field being a frame of display data, and converts this format to an interlaced format of two fields each of (N/2) lines to form one interlaced display frame. The fields of interlaced data are applied to a utilization device such as a display unit 12. For example, the non-interlaced data may have 570 lines in each field or frame and the interlaced data may have 285 lines for each of the two sequential fields. The data source 10 may provide the non-interlaced format so as to develop a high resolution picture with a minimum of flicker such as would result from displaying data on a cathode ray tube (CRT) having a phosphor with a relatively short retentivity time. The system of the invention is particularly applicable if a high resolution picture is desired when displaying the information on a CRT having phosphor with a relatively long retentivity time or a projection system in which a liquid crystal light valve is utilized.

In a display system utilizing a light valve, a projection light is applied to a polarizing prism and a light of a single polarization is passed to the light valve. The imaging light having an intensity that is a function of the input video data and formed by a CRT emitter is applied to the imaging surface of the light valve to vary the polarization of the projection light received from the prism, which modulated image light is reflected back to the prism. The prism passes only the rotated polarized light which is then projected for display. When utilizing a light valve with a relatively long retentivity time, it has been found that a comparable projected display with less band width and lower deflection power results when the system operates with video data having an interlaced format. Thus, for certain types of display or projection systems, conversion from a non-interlaced to interlaced format is highly desirable.

The system includes first and second random access memories 14 and 16, each of which stores a line of video data received on respective leads 18 and 20 from the data source 10. A line of video data in the illustrated system is a plurality of bits, each bit representing a picture element or pixel. In the illustrated system, the clock rate of the input pixels is 20 MHZ, for example, so that each line of data includes pixels or bits as each bit represents a pixel. The memories 14 and 16 are controlled to be alternately and at different pairs of input line times in the read mode and the write mode by signals WEA and WEB. The memories 14 and 16 are respectively addressed by counters 24 and 26, each of which applies ten bits on ten leads, for example, to the corresponding memory.

The counters 24 and 26 which are 12 bit counters each, respectively, include four bit counters 28, 30 and 32 and four bit counters 34, 36 and 38, coupled together in a conventional fashion. It is to be noted that because the counter chips are 4 bits each, a 12 bit counter is utilized, although only 9 bits are required to address the bits representing a line of data. A CLEAR A signal and a CLOCK A signal are applied to the address counter 24 and a CLEAR B signal and a CLOCK B signal are applied to the address counter 26, the CLOCK A and CLOCK B signals varying during alternate pairs of input line periods between 10 MHZ and 20 MHZ, for example. The line of video data is clocked into a first memory at a 20 MHZ rate while data is being read from the second memory at a 10 MHZ rate. During the next slow 10 MHZ horizontal line time the data is clocked into the second memory at a 20 MHZ rate and is read from the first memory at a 10 MHZ rate.

The digital data read from the memories 14 and 16 is respectively applied through leads 42 and 44 to flip flops 46 and 48 for shaping the pulsed data from the memories in response to a SLOW clock signal received at the CLK inputs of the flip flops on a lead 54. The SLOW CLOCK signal is applied through an inverter 52 to provide an inverted waveform on the lead 54. The output signals from the flip flops 46 and 48 are applied to respective NAND gates 58 and 60 for preventing any data from passing therethrough from the memory in which data is being written. It is to be noted that with some types of memories in accordance with the invention, the gates 58 and 60 may not be required. The gates 58 and 60 respond to respective timing signals B FAST and A FAST to alternately apply a line of digital data through a NOR gate 64 to a data lead 66. In order to form a combined video and synch signal in accordance with the standard TV format, a combiner 68 responds to the data signal on the lead 66, a SLOW SYNC signal and a VS (vertical synch) signal to apply a standard TV signal format to the display 70.

a slow timing unit 80 and a fast timing unit 82 respectively responsive to a SLOW CLOCK signal at 10 MHZ on a lead 88 and a FAST CLOCK signal at 20 MHZ from a lead 84, as provided by the data source 10 of FIG. 1. The FAST CLOCK signal which represents the single bit data rate is derived from the data source 10 of FIG. 1. A divider 86 responds to the signal on the lead 84 to develop the SLOW CLOCK signal on the lead 88. A multiplexer 90 receives a SLOW CLOCK signal, a SLOW WE signal and a SLOW CLR signal from the slow timing unit 80 and receives a FAST CLOCK signal, a FAST WE signal and a FAST CLR signal from the fast timing unit 82. The multiplexer 90 is switched by a bank select unit 92 responsive to a SLOW SYNC signal from the timing unit 81 to alternate the multiplexer switch positions each horizontal line time of the output data. The bank select unit 92 which develops a separate switching signal on alternate horizontal output line times, also provides the read or write gating signals B FAST and A FAST for controlling the respective gates 58 and 60 of FIG. 1. In order to change the phase of the operation of the memories 14 and 16 at the start of each input frame so as to alternately read out odd and even fields of odd and even lines, an odd-even select unit 91 is provided responsive to the vertical synchronizing signal VS from the source 10. The select unit 91 may include a flip flop that is triggered to its opposite state in response to each vertical synchronizing signal. The SLOW WE and the FAST WE signals may be formed by a suitable flip flop and gating arrangement with the flip flop being responsive to the FAST SYNC pulses provided in the timing unit 81. At each vertical sync time the field select unit 91 sets the flip flop that is responsive to the FAST SYNC pulses to its opposite state so that during the entire input frame time the SLOW WE and FAST WE pulses are shifted in time position or phase by one input line time from the previous input frame. A similar flip flop responsive to the FAST SYNC pulse is included in the timing circuit 81 to shift the time position or phase of the SLOW CLR and FAST CLR pulses by one input line time, at the start of each input frame. As a result, the WE A, WE B, CLR A, and CLR B signals for each sequential input frame start their pulse train delayed by one fast horizontal line period and the odd lines are read from one input frame with the even lines being read from the next input frame. The following table summarizes the occurrence of the timing signals that are utilized to control the converter.

| MEMORY SELECTED | CLOCK A | CLOCK B | $\overline{WEA}$ | $\overline{WEB}$ | CLR A | CLR B | B FAST | A FAST |
|---|---|---|---|---|---|---|---|---|
| 14 | SLOW | FAST | NO | YES | SLOW | FAST | YES | NO |
| 16 | FAST | SLOW | YES | NO | FAST | SLOW | NO | YES |

Although the units used in the system may be any suitable type to perform the functions in accordance with the principles of the invention, the following standard units are utilized in the illustrated system.
  Random access memories 14 and 16-Fairchild 93415A
  Four bit counters 28, 30, 32, 34, 36 and 38-74S161
  Flip flops 46 and 48-74S74
  Inverter 52-74S04
  Gates 58, 60 and 64-74S00

Referring now principally to FIG. 2, the timing of the system of FIG. 1 includes a timing unit 81 divided into This type of timing pulse formation, as shown in FIG. 2, and as described above is well known in the art and will not be explained in further detail.

Referring now also to the overall timing diagram of FIG. 3, the reception of the two frames of non-interlaced input data to form two fields representing one frame of interlaced output data will be further explained. The memories 14 and 16 will be respectively designated as memories A and B for clarity of explanation. During the first field time which may provide the even lines, the input data is illustrated as being the data of lines 10-15. Line 8 data is being read from memory A at line 10 time as output data while line 10 data is being written into memory B. At line 11 time that line of data is being written into memory A while a first half of line 10 is being read from memory B as output data. At line 12 time, the line 12 data is being written into memory A over the previously written line 11 data and the second half of line 10 data is being read from memory B as output data. At line 13 time the first half of line 12 data is read from the memory A and line 13 data is written into memory B and at line 14 time the second half of the line 12 data is read from memory A while line 14 data is written over the line 13 data in memory B. Similarly, at line 15 time, line 15 data is written into the memory A and the first half of the line 14 data is read from memory B. Thus, it can be seen that while one memory is writing two lines of fast data with the second or even line remaining in the memory, the other memory is reading the previous even line of data at a slow rate over two input line times. This operation continues in a repetitive manner for the entire even output field which is equal to the fast input frame time.

During formation of the second output field, which is illustrated as providing odd lines as output data, lines 10-15 are shown being received as input data. At line 10 time, as defined by the input data, line 10 data is written into memory A, and the first half of line 9 data is read from the memory B. At line 11 time line 11 data is written into the memory A and the second half of line 9 is read from memory B as output data. At line 12 time the first half of line 11 data is read from memory A and line 12 data is written into memory B, at line 13 time the second half of line 11 data is read from memory A and line 13 data is written over the line 12 data in memory B. This operation continues in a similar manner until the entire second field is applied to the output at the slow clock rate. Thus, for the even fields, only the even lines from a fast input frame are applied to the output at a slow rate which is one half of the fast rate and for the odd fields only the odd lines from a second input frame are applied to the output at the same slow rate. Because of the small change of informational content between two sequential input or non-interlaced frames to form, the two interlaced frames, the quality of the display is not substantially effected by the convertor of the invention.

Figure 4:
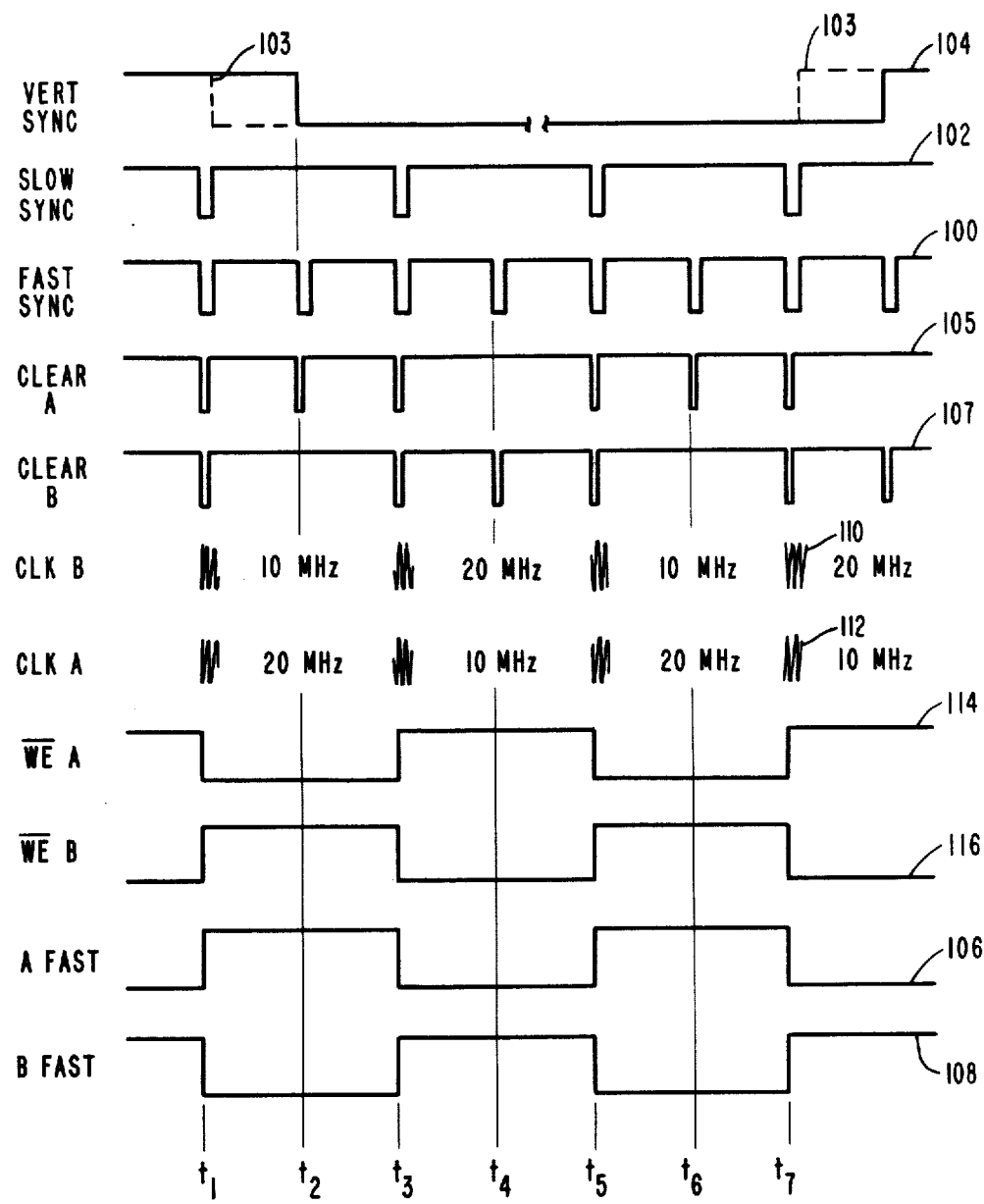
FIG. 4 is a schematic timing diagram of voltage as a function of time for further explaining the operation of the system of FIGS. 1 and 2.

Referring now to FIG. 4 as well as to FIGS. 1 and 2, the operation of the system will be explained in further detail. The FAST SYNC and SLOW SYNC signals of respective waveforms 100 and 102 are shown representing the fast and slow horizontal synchronizing signals respectively for the data source 10 and the output display 12. The FAST SYNC signal is derived from the data source 10 of FIG. 1 and the SLOW SYNC signal which is used as a horizontal synchronizing signal for the display 12 (FIG. 1) is derived from a divide by two circuit (not shown) in the timing circuit 81 responding to the FAST SYNC signal from the data source 10. The vertical sync signal (VS) utilized in both the source 10 and the display 12 is indicated by a waveform 104. Dotted portions 103 and 103a of the waveform 104 illustrate the shifting of the vertical sync pulse in the combiner 68 in alternate interlaced fields for displaying odd and even lines at adjacent positions on the display. At a time $t_1$, CLEAR A and CLEAR B pulses of respective waveforms 105 and 107 are applied to the counters 24 and 26 to reset both address counters to zero. At the time $t_1$ of the illustrated timing, A FAST and B FAST of respective waveforms 106 and 108 change to respectively high and low levels and the multiplexer 90 is controlled so that CLOCK B of a waveform 110 is the SLOW CLOCK at 10 MHZ and CLOCK A of a waveform 112 is the FAST CLOCK at 20 MHZ. The signals WE A and WE B of respective waveforms 114 and 116 respectively change to low and high levels so that memory 14 is in the write mode and memory 16 is in the read mode. Thus, since CLOCK B is at 10 MHZ, a line of data is read from memory 16 at the slow rate and since CLOCK A is at 20 MHZ a line of data is written into the memory 14 at the fast rate.

At a time $t_2$, the CLEAR A pulse causes the memory 14 to be cleared and the next fast clock line is written into that memory in the same memory cell positions as the previous line of data. Also at time $t_2$, the line of data continues to be read from the memory 16 at the slow rate of 10 MHZ. At a time $t_3$ the address counters of the memories 14 and 16 are cleared in response to CLEAR A and CLEAR B pulses of respective waveforms 105 and 107 and the CLOCK B and CLOCK A signals of respective waveforms 110 and 112 reverse their frequency to 20 MHZ and 10 MHZ. At the same time, the signals WE A and WE B change their values to respective high and low levels so that the memory 14 is in the read mode and the memory 16 is in the write mode. The signals A FAST and B FAST of respective waveforms 106 and 108 reverse their levels to respectively low and high values so that the gate 58 passes data and the gate 60 prevents data from passing therethrough. Thus, a line of data is read from memory 14 between times $t_3$ and $t_4$ at a 10 MHZ rate while the input line is written into the memory 16 between times $t_3$ and $t_4$ with the next input line of data being written into the memory 16 at the same memory cell positions as the previous line of data, between time $t_4$ and $t_5$. This operation is similar for either the first or second fields of output data, respectively, providing either the even field or the odd field at the output. The operation continues in a similar manner between times $t_5$ and $t_7$ with the address counters 24 and 26 being reset at both times when the readout of a slow rate line is completed.

Thus, there has been described a converter for forming interlaced frames of data from non-interlaced frames and that operates in real time such as may be required for data received from a transmission line. The converter accurately and reliably converts each line of input data to either an even or an odd frame of data without excessive storage or timing requirements. The two memories are relatively small as they are required to each have the capacity to store one line of digital data with each digital data element requiring only one binary bit. However, it is to be understood that the concept of the invention is equally applicable to storing grey scale data and representing the data as a series of words each of two or more bits. This modification can be readily accomplished by receiving coded input lines of data, increasing the size of the memory accordingly and adjusting the timing and the address counters to accomodate the selected number of bits for each coded picture element.

We claim:

1. A video converter responsive to first and second frames of non-interlaced odd and even lines of input data received during first and second non-interlaced frame periods comprising:

first and second memory means each storing a line of input data, a source of fast clock signals and slow clock signals coupled to said first and second memory means for being alternately applied to respective first and second memory means and to respective second and first memory means, alternating after each sequential pair of line periods of said input data, and control means coupled to said first and second memory means for controlling said memory means to alternately write one line of input data in one memory means at the rate of said fast clock signals while reading one line of input data from the other memory means at the rate of said slow clock signals during first and second interlaced output field periods respectively occuring during said first and second non-interlaced frame periods, said control means including means to control said first and second memory means to write and read said odd lines of said input data during said first non-interlaced frame periods and to write and read said even lines of input data during said second non-interlaced frame periods.

2. A system for converting first and second frame of input data of a plurality of odd and even lines of a non-interlaced format to output data of first and second fields of an interlaced line format comprising:

first and second memory means each having the capacity for storing a line of input data and each having addressing means, a source of fast clock and slow clock signals, multiplexing means coupled between said source and said addressing means of said first and second memory means for alternately applying the fast and slow clock signals to respective first and second memory means and to respective second and first memory means, alternating at the end of each sequential pair of input line periods, and a source of control signals coupled to said first and second memory means for alternately controlling one memory means to read a line of output data while being addressed in response to the slow clock signals, and controlling the other memory means to write a line of input data in response to said fast clock signals, said source of control signals including field select means for controlling said memory means to read out a first field of odd lines of output data during reception of a first frame of input data and to read out a second field of even lines of output data during reception of a second frame of input data.

3. The combination of claim 2 in which said source of fast clock signals and slow clock signals includes means to provide said slow clock signals at a frequency that is one half of the frequency of said fast clock signals.

4. The combination of claim 2 in which said memory means is a random access memory and in which the addressing means of said first and second memory means are each a counter forming addresses in response to said fast or said slow clock signals.

5. The combination of claim 3 in which said source of control signals includes means to apply clear signals to said addressing means at the end of reading each line of output data.

6. The combination of claim 5 further including first and second gating means respectively coupled to outputs of said first and second memory means, and in which said source of control signals includes means to apply first and second gating signals to said first and second gating means to pass data to an output from the memory means from which data is being read and to inhibit signals from passing to said output from the memory means into which data is being written.

7. A system responsive to first and second input frames of odd and even lines of input data received from an input source during respective first and second input frame periods, each input frame having a noninterlaced line format, said system converting said first and second input frames to an output frame of respective odd and even fields of output data having an interlaced format comprising:

first and second random access memories each having capacity for storing a line of input data, said first and second random access memories being responsive to said first and second input frames during first and second input frame periods, first and second counters respectively coupled to said first and second memories for sequentially addressing storage cells therein, a timing source coupled to said first and second counters for providing fast and slow clock signals thereto, said fast clock signals having pulses synchronized with a pixel rate of said input data and said slow clock signals having pulses synchronized with a pixel rate of said output data, said timing source providing write mode and read mode signals, said timing source including means to change the phase of the write mode and read mode signals so that odd and even fields are read from said memories during respective first and second input frame periods, multiplexing means coupled between said timing source and said first and second counters for alternately applying said fast and slow clock signals to said respective first and second counters and to said respective second and first counters, alternating each sequential second input line period, said multiplexing means being coupled to said first and second memories for alternately applying said write mode and said read mode signals to said respective first and second memories and to said respective second and first memories respectively in correspondence with said fast and slow clock signals applied to said first and second counters, and output means coupled to said first and second memories for receiving said odd and even fields of said lines of data in an interlaced format at the rate of said slow clock signals.

8. The combination of claim 7 in which said input source provides a vertical synchronizing signal and said timing source includes field select means responsive to said vertical synchronizing signal to change the phase of said write mode and read mode signals.

9. The combination of claim 8 in which said timing source provides first and second clear signals which are respectively applied to said first and second counters for clearing the counter addressing said memory receiving write mode signals at the end of each input line time and clearing the counter receiving read mode signals at the end of each second input line time, and said field select means includes means to change the phase of said first and second clear signals during alternate input frame periods.

10. The combination of claim 9 in which said timing source includes means to provide said slow clock signals at a rate that is one half of the rate of said fast clock signals.

11. The combination of claim 10 in which said output means includes interlaced display means.

* * * * *